United States Patent [19]

Enjo et al.

[11] Patent Number: 4,459,810
[45] Date of Patent: Jul. 17, 1984

[54] WORKING FLUIDS FOR USE WITH RANKINE CYCLE

[75] Inventors: Naonori Enjo, Suita; Hideki Aomi, Osaka; Yuko Harada, Ibaragi; Masahiro Noguchi, Osaka, all of Japan

[73] Assignee: Daikin Kogyo Co., Ltd., Osaka, Japan

[21] Appl. No.: 381,750

[22] Filed: May 25, 1982

[30] Foreign Application Priority Data

May 26, 1981 [JP] Japan .................................. 56-80533
May 26, 1981 [JP] Japan .................................. 56-80534

[51] Int. Cl.³ ...................... F01K 25/06; F01K 25/10; C09K 5/04
[52] U.S. Cl. .......................................... 60/651; 60/671; 252/67
[58] Field of Search ...................... 60/651, 671; 252/67

[56] References Cited

U.S. PATENT DOCUMENTS 3,203,194  8/1965  Fuderer .................................. 252/67
4,309,296  1/1982  Enjo et al. ............................ 252/67

Primary Examiner—Allen M. Ostrager
Attorney, Agent, or Firm—Larson and Taylor

[57] ABSTRACT

Working fluids for use with the Rankine cycle comprising 5 to 50% by weight of tetrafluoromethane, 40 to 95% by weight of trifluoromethane and 0 to 10% by weight of monochlorodifluoromethane.

8 Claims, 2 Drawing Figures

WORKING FLUIDS FOR USE WITH RANKINE CYCLE

This invention relates to novel working fluids for use with the Rankine cycle.

Heretofore water has been almost exclusively used as working fluids in the Rankine cycle in which thermal energy is converted into mechanical energy by vaporizing a liquid medium with heating, expanding the vapor in an expansion device (turbine) to produce mechanical energy, and then compressing, pressurizing by a pump and evaporating the medium so that the cycle is repeated. Although long applied as working fluids to steam engines, water has the following drawbacks. It has a limited application due to its high freezing point and great specific volume on vaporization; requires a larger installation and is lower in efficiency when using a low-temperature heating source; and readily freezes and becomes inserviceable at low temperatures.

In recent years, LNG (liquefied natural gas) has been increasingly used as an energy source for producing town gas or generating electricity. Now it is used to lower the temperature of a liquid by utilizing the latent heat of vaporization of a portion of LNG (hereinafter referred to as "evaporative cooling by LNG").

The evaporative cooling by LNG is most effectively utilizable in generating electricity by the Rankine cycle. The Rankine cycle for power generation is schematically shown in FIG. 1.

BRIEF DESCRIPTION OF THE DRAWING

Referring to FIG. 1, LNG is pressurized by a pump (1) and proceeds to a condenser (2) (evaporator) in which LNG vaporizes by heat exchange with a medium. The vaporized LNG, namely natural gas (3), is used as town gas or fuel in power plants.

Figure 1:
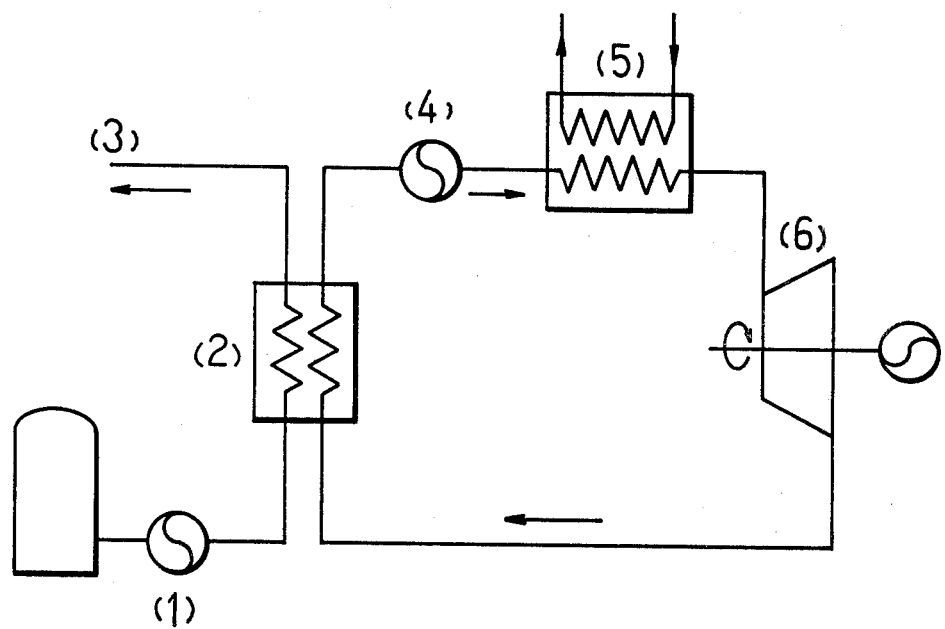
FIG. 1 is a schematic drawing of a Rankine cycle utilizing the novel working fluids hereinvolved.

The medium for use with the Rankine cycle is cooled and liquefied by LNG at a condenser (2). The liquefied medium is pressurized at a pump (4) and then advances to an evaporator (5) where it is heated and vaporized by sea water. The vapor thus prepared is sent to a turbine generator (6) at which it undergoes adiabatic expansion, thereby generating electricity. The medium thus expanded and having a reduced pressure returns to the condenser (2) where it is cooled and liquefied again by LNG.

A liquefied gas having a low boiling point and unfreezing at low temperature is suitable as the medium for the illustrated Rankine cycle as distinct from that involving waste heat or the like. Examples of liquefied gas useful as the medium are tetrafluoromethane ($CF_4$), hexafluoroethane ($C_2F_6$), trifluoromethane ($CHF_3$), octafluoropropane ($C_3F_8$), etc. Attempts have been heretofore made to use methane, ethane, propane and like hydrocarbons as well as the foregoing hydrocarbon fluorides in thermoelectric generation.

When generating electricity by the Rankine cycle utilizing the evaporative cooling by LNG, it is essential to employ the evaporative cooling by LNG at increased efficiency and produce an increased generator output. However, the foregoing hydrocarbons have a limited use in fulfilling this requirement because of their high explosiveness. Further $CH_4$, $C_2H_6$ and like hydrocarbons having a high purity are not easily available. In utilizing the cooling available in LNG, it is most important to effectively employ evaporative cooling by LNG. Therefore, there is advantageously used LNG having a temperature as close as to about $-162°$ C. at which it is stored in a tank. With apparatus of the Rankine cycle, the medium in the condenser (2) preferably has a pressure higher than the atmospheric pressure. With a lower pressure, the medium would be mixed with air if a leak should occur for example at the sealed portion in the axle of the turbine. In such event, the characteristics of the cycle would be seriously impaired or the medium near the outlet of the turbine would have increased specific volume which would require a turbine and a condenser both with a greater capacity. For these reasons, it is preferred to use a medium of low boiling point for the purpose of utilizing the evaporative cooling by LNG at lowest temperatures. However, the use of a medium having a low boiling point results in an extremely high pressure in the evaporator, consequently requiring an evaporator with a high pressure resistance and a pump with a greater power.

For effective use of the evaporative cooling by LNG, it has been proposed to employ two or more condensers each involving a different pressure, namely a low-pressure stage and a high-pressure stage. With the proposed method, a portion of the medium is treated at a low pressure in a low-pressure condenser to utilize the evaporative cooling in a low-temperature zone by evaporation of LNG, while the other portion of the medium is condensed at a high pressure in a high-pressure condenser to employ the evaporative cooling in a high-temperature zone by evaporation of LNG. This method, however, entails serious advantages in respect of apparatus in that it requires condensers of low to high pressures or at least a plurality of lines arranged in parallel between the inlet of a turbine and the outlet of a condenser and involves a hydraulic pump positioned downstream of the low-pressure condenser. Further the number of condensers used in this method is limited, and this prevents complete utilization of evaporative cooling by LNG.

It is an object of this invention to provide working fluids for use with the Rankine cycle which fluids can be used with high safety and can exceedingly increase the generator output.

It is another object of this invention to provide working fluids for use with the Rankine cycle using LNG.

It is a further object of the invention to provide working fluids for use with the Rankine cycle using LNG which fluids are capable of markedly increasing the generator output even in operating a condenser at a high pressure.

It is a still further object of the invention to provide working fluids for use with the Rankine cycle using LNG which fluids are able to remarkably increase the pressure during the vaporization of LNG without extremely elevating the operating pressure and power of a pump.

These objects and other characteristics of this invention will become apparent from the following description.

The foregoing objects can be achieved by using the following mixture as a working fluid in the Rankine cycle:

(i) a mixture of 5 to 50% by weight of tetrafluoromethane and 50 to 95% by weight of trifluoromethane or (ii) a mixture prepared by adding monochlorodifluoromethane to the mixture (i) in place of a portion of the trifluoromethane.

The present invention provides working fluids for use with the Rankine cycle comprising 5 to 50% by weight of tetrafluoromethane and 50 to 95% by weight of trifluoromethane and working fluids for use with the Rankine cycle comprising 5 to 50% by weight of tetrafluoromethane, 40 to 90% by weight of trifluoromethane and 5 to 10% by weight of monochlorodifluoromethane.

The mixture (ii) exhibits effects higher than the mixture (i) in that the evaporative cooling by LNG is utilizable over a high-temperature zone, thereby producing increased generator output.

The working fluids of this invention can be easily prepared by mixing the above-specified hydrocarbon fluorides in the above-specified proportions.

The working fluids according to this invention are usable with high safety, have outstanding properties as the medium for the Rankine cycle and are markedly suited to power generation utilizing the evaporative cooling by LNG. Stated more specifically, the working fluids of this invention ensures high safety and increased generator output and enables the operation of a condenser at a wide range of low to high pressure according to a specific purpose. Further the present working fluids are able to sharply increase the generator output when the condenser is operated at a high pressure.

This invention will be described below in more detail with reference to examples and comparison examples.

EXAMPLES 1 TO 3 AND COMPARISON EXAMPLES 1 TO 3

LNG comprising 90% of methane, 6% of ethane and 4% of propane was vaporized at pressures of 10, 20 and 30 atmospheres; while the Rankine cycle illustrated in FIG. 1 was carried out by use of mediums having compositions given in Table 1 below, utilizing evaporative cooling by vaporization of LNG.

TABLE 1

| | Composition of mediums | | | | |
|---|---|---|---|---|---|
| | Trifluoromethane | Tetrafluoromethane | LNG vaporization pressure | | |
| | | | 10 | 20 | 30 |
| Comp. Ex. 1 | 100% | 0% | 3370 KW | 2670 KW | 2360 KW |
| Ex. 1 | 90 | 10 | 3370 | 2820 | 2520 |
| Ex. 2 | 80 | 20 | 3370 | 2930 | 2650 |
| Ex. 3 | 60 | 40 | 3640 | 3200 | 2850 |
| Comp. Ex. 2 | 40 | 60 | 3990 | 3410 | 3050 |
| Comp. Ex. 3 | 20 | 80 | 4770 | 3910 | 3340 |

The vaporization rate of LNG was 100 t/hr; the temperature in the inlet of the turbine, 5° C.; and a pinch temperature (a minimum temperature difference between LNG and the medium), 10° C. Table 1 shows the maximum generator outputs (KW) thus produced.

Table 2 indicates the pressures of the high-pressure zone (pressures between the evaporator and turbine generator) and the pressures of the low-pressure zone (pressures between the turbine generator and condenser) when operating at a temperature of −60° C. in the outlet of the turbine generator. Table 3 shows the powers of the pump required when operating at a temperature of −60° C. in the outlet of the turbine and at a pressure of 30 atm. during vaporization of LNG.

TABLE 2

| | High-pressure zone (atm) | Low-pressure zone (atm) |
|---|---|---|
| Comp. Ex. 1 | 12.6 | 1.3 |
| Ex. 1 | 13.6 | 1.5 |
| Ex. 2 | 15.4 | 2.0 |
| Ex. 3 | 18.0 | 4.7 |
| Comp. Ex. 2 | 24.0 | 6.4 |
| Com. Ex. 3 | 36.9 | 10.1 |

TABLE 3

| | Power of pump (KW) |
|---|---|
| Comp. Ex. 1 | 70 |
| Ex. 1 | 75 |
| Ex. 2 | 83 |
| Ex. 3 | 120 |
| Comp. Ex. 2 | 190 |
| Com. Ex. 3 | 320 |

As apparent from the results shown above, the use of mediums having compositions according to this invention (Examples 1 to 3) leads to the marked increase in pressures and particularly high pressures during the vaporization of LNG without exceedingly elevating the operating pressure and power of the pump.

Figure 2:
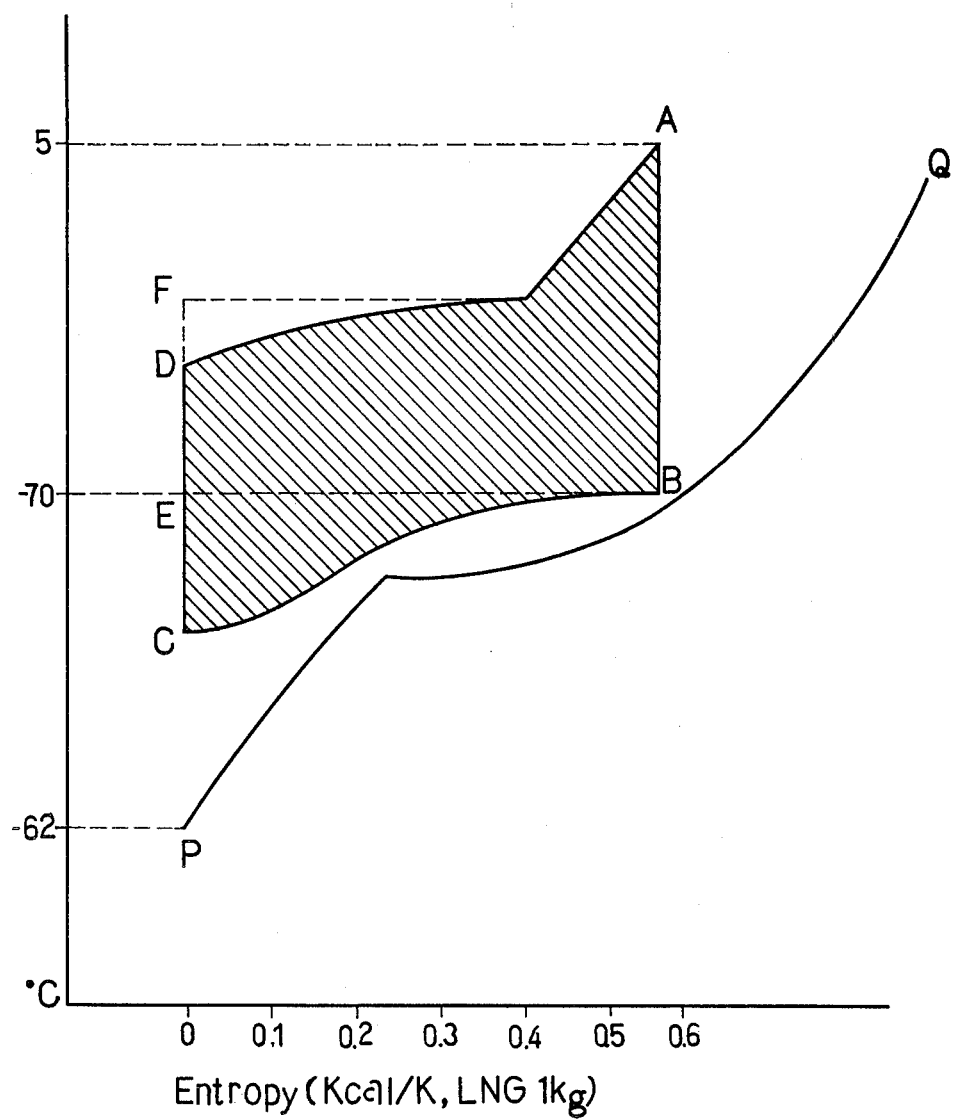
FIG. 2 is a temperature—entropy diagram of both the LNG and working fluids in a typical cycle as shown in FIG. 1.

FIG. 2 shows a temperature-entropy diagram indicative of the variation in vaporization of LNG and the Rankine cycle of Example 1 using the working fluids and utilizing the evaporative cooling by LNG in Example 1. The curve PQ in FIG. 2 indicates the temperatue vs. entropy relationship in which 1 kg of LNG was vaporized at a pressure of 30 atm. The portion enclosed with lines A-B-C-D in FIG. 2 shows a temperature-entropy relationship for the medium depicted so that the pinch point is 10° C. in the curve for the vaporization change of LNG when operating at −70° C. in the outlet of the turbine and at 5° C. in the inlet thereof. The hatched portion enclosed by lines A-B-C-D in FIG. 2 illustrates the turbine generator outputs. For the increase in the area of the hatched portion, the dew-point curve for the medium shown by a line C-B must be close to the curve PQ showing the vaporization change of LNG. It is seen that the Rankine cycle produces a great generator output compared with that obtained for comparison purpose by using known trifluoromethane along as the working fluid and shown by the portion enclosed with lines A-B-E-F.

EXAMPLES 4 TO 6 AND COMPARISON EXAMPLES 4 AND 5

LNG consisting of 90% of methane, 6% of ethane and 4% of propane was evaporated at pressures of 10, 20 and 30 atm., while the Rankine cycle shown in FIG. 1 was conducted in the same manner as in Example 1 by using mediums having compositions given in Table 4 below and utilizing the evaporative cooling by LNG. Table 5 illustrates the maximum generator outputs (KW).

TABLE 4

| Composition | Tetrafluoromethane (%) | Trifluoromethane (%) | Monochlorodifluoromethane (%) |
|---|---|---|---|
| Comp. Ex. 1 | — | 100 | — |
| Ex. 4 | 10 | 80 | 10 |
| Ex. 5 | 20 | 70 | 10 |

TABLE 4-continued

| Composition | Tetrafluoro-methane (%) | Trifluoro-methane (%) | Monochloro-difluoromethane (%) |
|---|---|---|---|
| Ex. 6 | 40 | 50 | 10 |
| Comp. Ex. 4 | 60 | 30 | 10 |
| Comp. Ex. 5 | 80 | 10 | 10 |

TABLE 5

| Medium | LNG vaporization pressure | | |
|---|---|---|---|
| | 10 (atm) | 20 (atm) | 30 (atm) |
| Comp. Ex. 1 | 3370 | 2670 | 2360 |
| Ex. 4 | 3370 | 2820 | 2520 |
| Ex. 5 | 3370 | 2950 | 2650 |
| Ex. 6 | 3770 | 3280 | 3120 |
| Comp. Ex. 4 | 3670 | 3300 | 3260 |
| Comp. Ex. 5 | 3770 | 3420 | 3300 |

Table 6 shows the pressures of the high pressure zone (pressures between the evaporator and turbine generator) and pressures of the low-pressure zone (pressures between the turbine generator and condenser). Table 7 indicates the powers of the pump when operating at −80° C. in the outlet of the condenser and at 30 atm. during the vaporization of LNG.

TABLE 6

| | Pressure of high pressure zone (atm) | Pressure of low pressure zone (atm) |
|---|---|---|
| Comp. Ex. 1 | 7.7 | 1.2 |
| Ex. 4 | 9.0 | 2.0 |
| Ex. 5 | 10.6 | 3.0 |
| Ex. 6 | 14.1 | 5.0 |
| Comp. Ex. 4 | 18.2 | 7.2 |
| Comp. Ex. 5 | 24.4 | 9.3 |

TABLE 7

| | Power of pump (KW) |
|---|---|
| Comp. Ex. 1 | 40 |
| Ex. 4 | 42 |
| Ex. 5 | 44 |
| Ex. 6 | 66 |
| Comp. Ex. 4 | 77 |
| Comp. Ex. 5 | 143 |

As seen from the results shown above, the mediums having compositions according to this invention (Examples 4 to 6) sharply increases the pressures and particularly high pressures during the vaporization of LNG without markedly elevating the operating pressures and powers of the pump.

The temperature-entropy relationship indicative of the Rankine cycle and vaporization change of LNG when using the working fluids in Examples 4 to 6 was found similar to that resulting from Example 1.

I claim:

1. A working fluid suitable for use in a Rankine cycle, said working fluid comprising 5 to 50% by weight of tetrafluoromethane, 40 To 95% by weight of trifluoromethane and 0 to 10% by weight of monochlorodifluoromethane.

2. A working fluid according to claim 1 which comprises 5 to 50% by weight of tetrafluoromethane and 50 to 95% by weight of trifluoromethane.

3. A working fluid according to claim 1 which comprises 5 to 50% by weight of tetrafluoromethane, 40 to 90% by weight of trifluoromethane and 5 to 10% by weight of monochlorodifluoromethane.

4. In a process of carrying out the Rankine cycle in which a working fluid is vaporized with heating, and in which the vaporized working fluid is expanded in an expansion device to produce mechanical energy and then liquified, the improvement wherein said working fluid comprises 5 to 50% by weight of tetrafluoromethane, 40 to 95% by weight of trifluoromethane and 0 to 10% by weight of monochlorodifluoromethane.

5. A process according to claim 4 wherein said working fluid comprises 5 to 50% by weight of tetrafluoromethane and 50 to 95% by weight of trifluoromethane.

6. A process according to claim 4 wherein said working fluid comprises 5 to 50% by weight of tetrafluoromethane, 40 to 90% by weight of trifluoromethane and 5 to 10% by weight of monochlorodifluoromethane.

7. A process according to claim 4 wherein the working fluid is liquified by evaporative cooling with liquified natural gas.

8. A process according to claim 7 wherein said liquified natural gas is stored prior to use at a temperature of about −162° C.

* * * * *